United States Patent
Rogers et al.

(10) Patent No.: US 6,874,076 B2
(45) Date of Patent: Mar. 29, 2005

(54) METHOD, SYSTEM, AND COMPUTER PROGRAM PRODUCT FOR MIGRATING DATA FROM ONE REAL PAGE TO ANOTHER

(75) Inventors: Mark Douglass Rogers, Austin, TX (US); Randal Craig Swanberg, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 344 days.

(21) Appl. No.: 10/262,177

(22) Filed: Sep. 30, 2002

(65) Prior Publication Data

US 2004/0064673 A1 Apr. 1, 2004

(51) Int. Cl.$^7$ ............................................. G06F 12/00
(52) U.S. Cl. ..................... 711/207; 711/202; 711/203; 711/204; 711/205; 711/206
(58) Field of Search ................................ 711/202–207

(56) References Cited

U.S. PATENT DOCUMENTS

| | | | | |
|---|---|---|---|---|
| 5,127,094 A | * | 6/1992 | Bono | ............................ 711/2 |
| 5,303,378 A | * | 4/1994 | Cohen | ........................ 710/264 |
| 5,592,625 A | * | 1/1997 | Sandberg | .................... 711/147 |
| 6,304,951 B1 | | 10/2001 | Mealey et al. | .............. 711/206 |

OTHER PUBLICATIONS

"Synchronization of TLB Invalidate Broadcasts using a TLBSYNC Command", IBM TDB, vol. 37, issue 5, p. 71–72, May 1994.*

* cited by examiner

Primary Examiner—T. Nguyen
(74) Attorney, Agent, or Firm—Duke W. Yee; Mark E. McBurney; Lisa L. B. Yociss

(57) ABSTRACT

A system, method, and computer program product are disclosed for migrating real pages. A real page of data is established. Virtual addresses that are associated with the real addresses that are included within the real page are generated. A mapping table is established that includes mappings of the virtual addresses to these real addresses. A routine is executed that accesses the mapping table to obtain the mappings of virtual addresses to real addresses. The routine utilizes the virtual addresses to access the data that is stored in the real page. While the routine is executing, the data is migrated from the real page to a new real page. The mapping table is then updated while the routine is executing so that the routine utilizes the same virtual addresses to access the data that is now stored in the new real page. Execution of the routine continues while the mapping table is being updated.

39 Claims, 4 Drawing Sheets

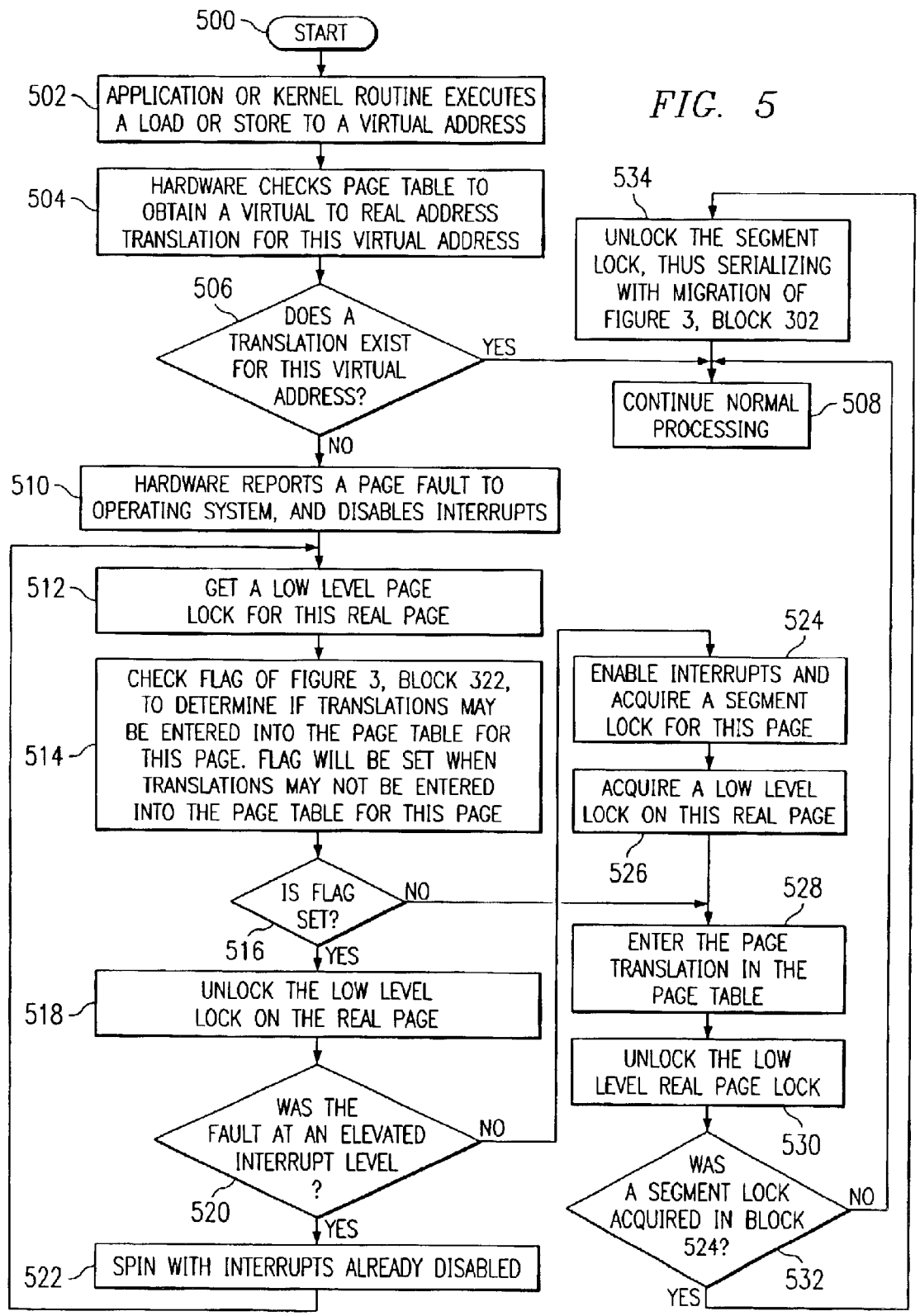

METHOD, SYSTEM, AND COMPUTER PROGRAM PRODUCT FOR MIGRATING DATA FROM ONE REAL PAGE TO ANOTHER

BACKGROUND OF THE INVENTION

1. Technical Field

The present invention relates generally to the field of computer systems and, more specifically to a data processing system, method, and computer program product for migrating data from one real page to another.

2. Description of Related Art

Personal computer systems are well known in the art. They have attained widespread use for providing computer power to many segments of today's modern society. Personal computers may be defined as desktop systems, floor standing systems, or portable microcomputers. Examples of such personal computer systems are IBM's PC series, Aptiva series, and Thinkpad series.

Many computer systems include a virtual memory address space which permits an application or process to address a space which is larger than the main memory included within the system. In virtual memory systems, it is necessary to translate virtual addresses into physical addresses in order to execute commands. One common method for performing the translations is to perform a page table look-up.

The virtual address space is typically divided into equal sized pages. A page table, also called a mapping table or translation table, is maintained which includes a physical address for the first byte of main memory for each page of the virtual address space. The page table is stored in main memory and is accessed each time a virtual address is included within a command. In this manner, each time a virtual address is encountered, the physical address must be determined.

A number of the upper bits of the virtual address are used to determine a global virtual memory segment in the system. A number of the middle bits are used to determine an associated page within that segment. The lower ordered bits are utilized as an offset into the page to locate the starting physical address for the particular virtual address. Therefore, for each virtual address, the page table must be accessed to determine the starting physical address for the associated page. The page table is hashed by segment identifier and page number within the segment in order to locate the starting physical address within the page table. Thereafter, the starting physical address must be added to the offset to determine the physical address which is associated with the virtual address of interest.

Typically, the page table is managed by a virtual memory manager (VMM). On occasion the data will be copied from one real page to a new real page. When this occurs, the page table will need to be changed so that the same virtual addresses will now point to the new real page.

Therefore, a need exists for a method, system, and computer program product for migrating real pages without halting the execution of routines that are currently accessing the real pages through virtual addresses.

SUMMARY OF THE INVENTION

A system, method, and computer program product are disclosed for migrating data from one real page to another. A real page of data is established. Virtual addresses are generated that are associated with the real addresses that are included within the real page. A virtual memory manager explicitly inserts translations into a page table, where the translations map the virtual addresses to these real addresses. A routine is executed that attempts to access the page table to obtain the translations of virtual addresses to real addresses. While the routine is executing, the data is being migrated from the real page to a new real page. The translations of the virtual addresses to these real addresses are removed from the page table. The routines that are attempting to access the translations receive a page fault and spin while the data is being migrated. Once the data has been migrated, the routines may again access the page table to obtain translations. The page table is updated while the routine is executing so that the routine utilizes the same virtual addresses to access the data that is now stored in the new real page. Execution of the routine continues while the page table is being updated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a high level flow chart which illustrates executing a routine that accesses virtual addresses that are mapped to real addresses where the data stored in the real page addressed by the real addresses is being migrated during the execution of this routine in accordance with the present invention.

DETAILED DESCRIPTION OF THE PREFERRED EMBODIMENT

Figure 1:
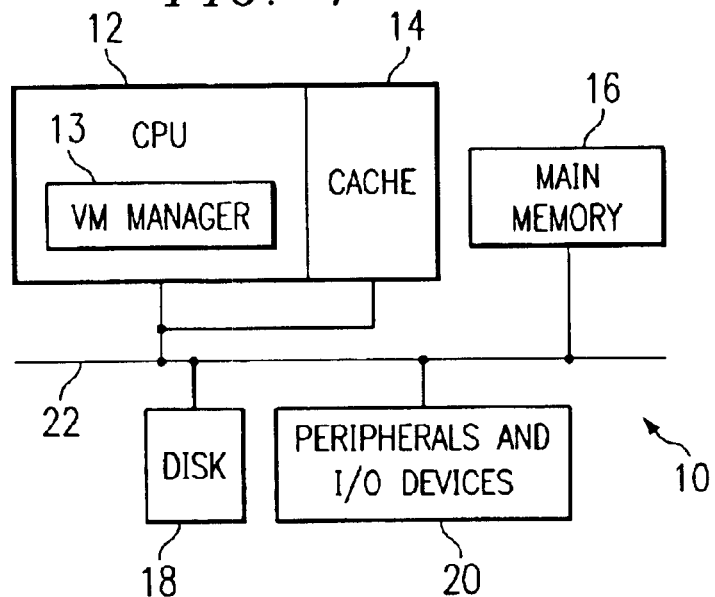
FIG. 1 illustrates a pictorial representation of a data processing system which may be utilized to implement the method and system of the present invention.

A preferred embodiment of the present invention and its advantages are better understood by referring to the figures, like numerals being used for like and corresponding parts of the accompanying figures.

The present invention is a method, system, and computer program product for migrating data from a source real page to a target real page in a system that utilizes virtual addressing without halting the execution of routines that access the virtual addresses that point to the source real page. The migration process is transparent to routines, also referred to as applications or programs, that are accessing virtual addresses that point to the real page being migrated. In addition, operating processes may be accessing the affected memory locations, through loads and stores, while the data is being migrated.

The operating system processes that fault at an interrupt level will spin at an elevated interrupt level while the migration is being performed. Other routines spin on a low level page lock while migration is being performed.

The migration process is initiated by the operating system. When data is to be migrated from a source real page, a segment lock is first obtained for the source real page. A determination is made regarding whether the real page is currently in use by checking a use counter. If the page is not already in use, a flag is set to indicate that the page is now in use.

The translations of the virtual addresses to the real addresses of the target real page are removed from the page table. If other routines attempt to access the translations for these virtual addresses, the other routines will receive a page fault and then these routines will spin. In this manner, the other routines will be kept from accessing the translations while the migration is being completed.

Data is then copied from the source real page to the target real page in real mode. After the data is copied, new translations from the original virtual addresses to the new real addresses that are included in the target real page are stored in the page table. Any processes or routines that are spinning are released and the segment lock is released.

Once the other routines are released from spinning, they again attempt to access a translation for one of the virtual addresses. At this time, if no translation exists, the routine will calculate a translation and store it in page table.

Some routines access memory using the real addresses directly instead of virtual addresses. In order to synchronize these accesses with the migration process, these routines are required to call a service before accessing the real addresses. The service then checks the current status of the flag to determine if the real page that includes the particular real address being accessed is in use. If a migration process is currently underway, the flag will be set. Otherwise, the flag will be clear. If the flag is set, the routine that is attempting to access the real address directly spins until the flag is cleared. Once the flag is cleared, the routine then increments a use counter, accesses the real page, and then decrements the use counter. The use counter is used by the migration process to determine whether any routines other than the migration process is currently using the real page that the migration process is attempting to migrate.

FIG. 1 illustrates a pictorial representation of a data processing system which may be utilized to implement the method and system of the present invention. Data processing system 10 may be implemented utilizing any type of computer system, such as a personal computer, mini-computer, or mainframe computer, suitably programmed to execute the methods and processes described below. Data processing system 10 includes a central processing unit 12 having a virtual memory manager 13 and an associated cache 14, a main memory 16, a disk 18, and other peripherals and/or input/output (I/O) devices 20 coupled together utilizing a bus 22. Devices 20 may include printers, plotters, a mouse, a joy stick, and/or other disks. Those skilled in the art will recognize that multiple data processing systems such as system 10 may be coupled together. In addition, data processing system 10 may include multiple processors.

Data processing system 10 may be a logically partitioned data processing system. A logical partitioning option (LPAR) within a data processing system (platform) allows multiple copies of a single operating system (OS) or multiple heterogeneous operating systems to be simultaneously run on a single data processing system hardware platform. A partition, within which an operating system image runs, is assigned a non-overlapping subset of the platform's hardware resources. These platform allocable resources include one or more architecturally distinct processors with their interrupt management area, regions of system memory, and input/output (I/O) adapter bus slots. The partition's resources are represented by its own open firmware device tree to the OS image. A dynamic logically partitioned system (DLPAR) provides for the dynamic addition or removal of memory while the operating system is running without rebooting a partition.

The present invention may be utilized in a DLPAR environment. In the DLPAR environment, a program will select memory to be removed. The program will then call the kernel. The operating system will migrate the data from the source real page to a target real page executing the processes described in more detail below. Thus, the data may be migrated from one real page to another while an application, or program, is executing. The migration is initiated and executed by the operating system. The migration is transparent to applications that are executing and utilizing the real pages through virtual addresses.

Figure 2:
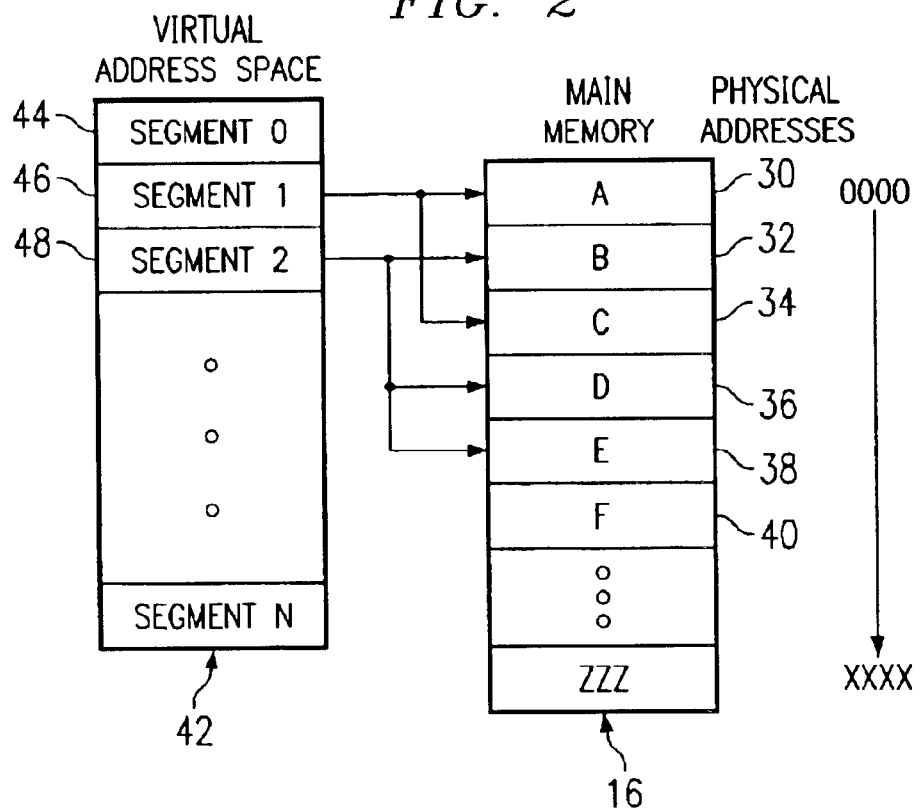
FIG. 2 depicts a pictorial representation of a main memory including a plurality of storage locations which are addressed utilizing a plurality of physical addresses, and a virtual address space which may be utilized by an application to address the main memory in accordance with the method and system of the present invention.

FIG. 2 depicts a pictorial representation of a main memory including a plurality of storage locations which are addressed utilizing a plurality of physical, also called real, addresses, and a virtual address space which may be utilized by an application to address the main memory in accordance with the method and system of the present invention. Data processing system 10 includes a virtual memory manager for permitting a user to address a virtual address space which is much larger than the number of physical storage locations included within main memory 16.

Main memory 16 includes a plurality of physical storage locations 30–40. A different physical address is utilized to address a particular storage location. For example, location 30 is addressed utilizing physical address "0000".

A virtual memory address space 42 is included within system 10. Virtual memory address space 42 is divided into a plurality of segments 44–48. The segments need not be a fixed size, and may include a collection of pages of virtual memory. Each segment will include a plurality of different virtual memory addresses. At any given time, each segment resides either in main memory 16 or within disk 18.

In FIG. 2, a region of main memory 16 has been temporarily associated with segment 46 of the virtual memory. Segment 46 is temporarily associated with physical addresses 30 and 34. A region of main memory will often include discontiguous main memory storage locations. In addition, a second region of main memory 16 has been temporarily associated with segment 48. Segment 48 is temporarily associated with physical addresses 32, 36, and 38. Segment 44 is not temporarily associated with any region of main memory 16.

Figure 3:
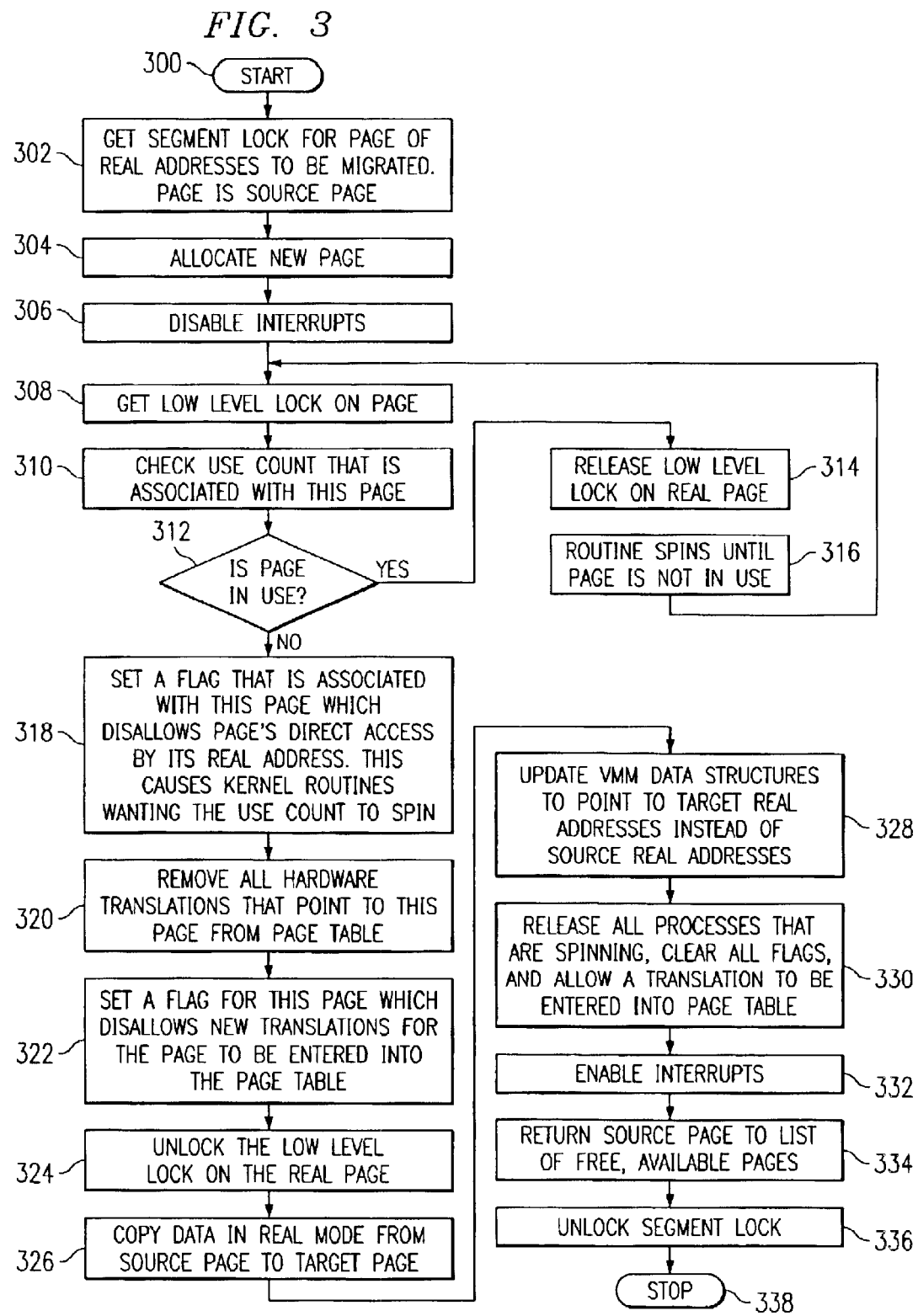
FIG. 3 depicts a high level flow chart which illustrates migrating data from a source real page to a target real page in accordance with the present invention.

FIG. 3 depicts a high level flow chart which illustrates migrating data from a source real page to a target real page in accordance with the present invention. The process starts as depicted by block 300 and thereafter passes to block 302 which illustrates getting a segment lock for a page of real addresses to be migrated. This page is the source real page. A virtual memory segment is a logically group set of virtual memory objects.

Next, block 304 depicts allocating a new page. This page is the target real page. The process then passes to block 306 which illustrates disabling interrupts. Interrupts must be disabled because if an interrupt handler interrupted page migration on the same CPU, it could potentially try to acquire a use count lock on that physical address. The interrupt handler, if interrupts are not disabled, could load/store to a physical address, which would result in spinning forever at interrupt level since migration would never finish because the interrupt handler would never return to it.

Block 308, then, depicts getting a low level lock on the page. Next, block 310 depicts checking the use count that is associated with this source page. If the page is in use, the use count will be a value greater than one. If the page is not in use, the use count will be zero.

The process then passes to block 312 which illustrates a determination of whether or not this page is currently in use. If a determination is made that this page is in use, the process passes to block 314 which illustrates releasing the low level lock on the real page. Thereafter, block 316 depicts the routine spinning until the page is not in use. The process then passes back to block 308.

Referring again to block 312, if a determination is made that this page is not in use, the process passes to block 318 which depicts setting a flag that is associated with this page with disallows the page to be accessed directly using its real address. This causes the kernel routine wanting the use count to spin. Next, block 320 illustrates removing all hardware translations that point to this page from the page table. Thus, the mappings of the virtual addresses to the original real addresses are removed. Thereafter, block 322 depicts setting a flag for this page which disallows new translations for this page from being entered into the page table. Next, block 324 illustrates unlocking the low level lock on this real page.

The process then passes to block 326 which depicts copying the data in real mode from the source real page to the target real page. Real mode is a standard mode of execution. Real mode disables the hardware virtual address translation logic. All addresses generated by the processor in real mode, i.e. load, store, instruction fetch, are interpreted directly, i.e. with no translation. They are real addresses bypassing the virtual address translation logic. The significance of doing a page copy in real mode is that it eliminates dependencies on the page table translation being present for the source and target pages.

The process then passes to block 328 which illustrates updating the virtual memory manager (VMM) data structures to point to the target real addresses instead of the source real addresses. Thus, new translations are created which are mappings of these same virtual addresses to new real addresses. Next, block 330 depicts releasing all processes that are spinning, clearing the flags, and allowing a translation to be entered in the page table. Then, interrupts are disabled, as depicted by block 332. Block 334, then, illustrates returning the source page to the list of free, available pages. Thereafter, block 336 depicts unlocking the segment lock. The process then terminates as illustrated by block 338.

Figure 4:
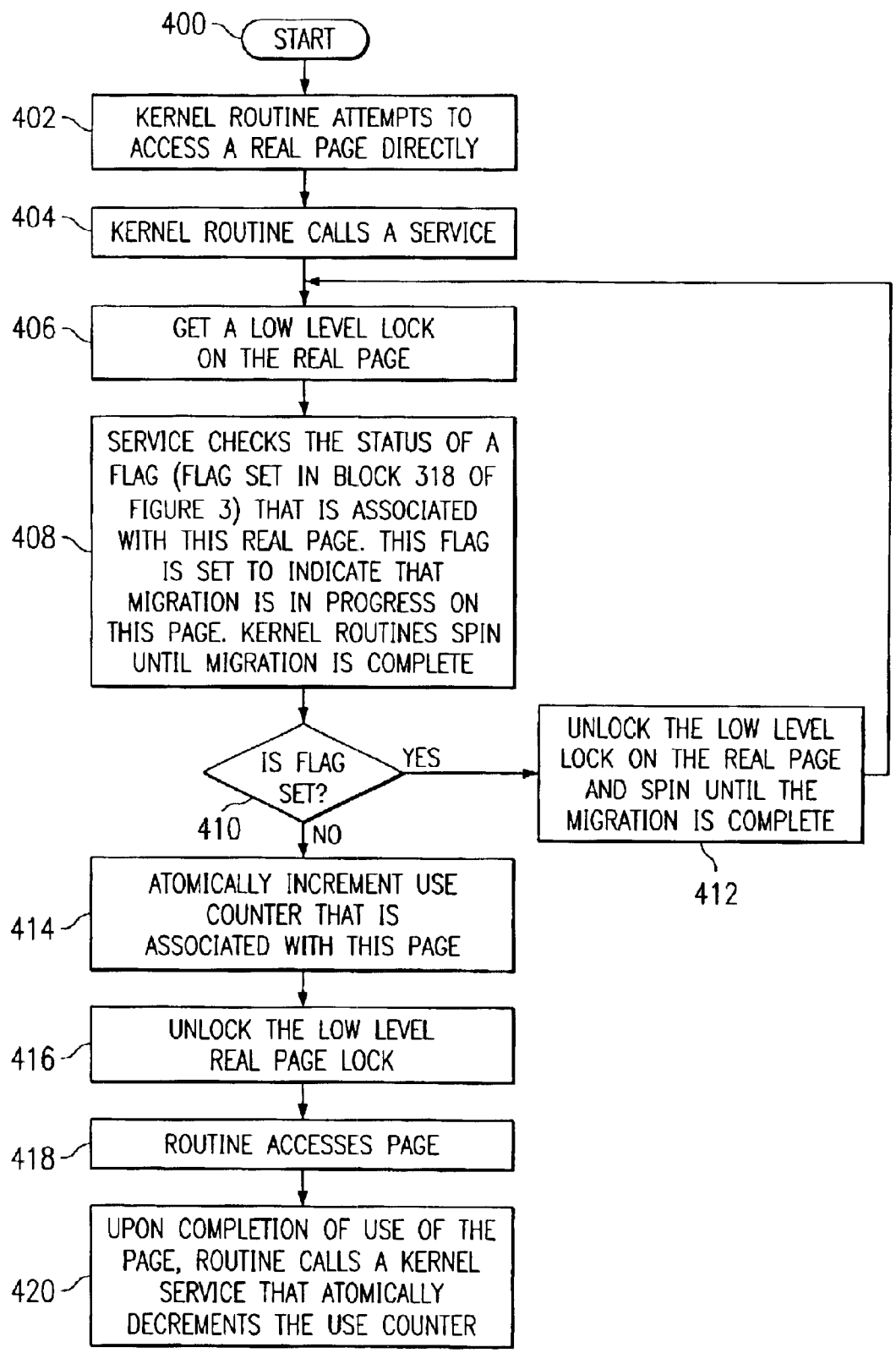
FIG. 4 illustrates a high level flow chart which depicts executing a routine that accesses real pages directly utilizing their real addresses instead of virtual addresses in accordance with the present invention.

FIG. 4 illustrates a high level flow chart which depicts executing a routine that accesses real pages directly utilizing their real addresses instead of virtual addresses in accordance with the present invention. The process starts as depicted by block 400 and thereafter passes to block 402 which illustrates the kernel routine attempting to access a real page directly utilizing the real addresses instead of utilizing the virtual addresses that are mapped to these real addresses. Next, block 404 depicts calling the kernel calling a service. The kernel routine itself calls a well-defined VMM service which increments the use count on the specified page if the page is not currently being migrated. If the page is being migrated, the kernel routine spins, inside the VMM service, until the migration is complete. Once the migration is complete, the VMM service will increment the use count.

The process then passes to block 406 which depicts getting a low level lock on the real page. Block 408, then, illustrates the service checking the status of a flag that is associated with this real page. The flag is set to indicate that migration is in progress on this page. Kernel routines spin until migration is complete. The process then passes to block 410 which depicts a determination of whether or not the flag is set. If a determination is made that the flag is set, the process passes to block 412 which illustrates unlocking the low level lock on the real page and spinning until migration is complete. The process passes back to block 406.

Referring again to block 410, if a determination is made that the flag is not set, the process passes to block 414 which depicts atomically incrementing the use counter that is associated with this page. Thereafter, block 416 depicts unlocking the low level real page lock. The process then passes to block 418 which illustrates the routine accessing the page. Block 420, then, depicts the routine calling a kernel service that atomically decrements the use counter when the routine has finished accessing the page. The use count is managed using atomic "fetch and add" primitives which are well known in the art.

FIG. 5 depicts a high level flow chart which illustrates executing a routine that accesses virtual addresses that are mapped to real addresses where the data stored in the real page addressed by the real addresses is being migrated during the execution of this routine in accordance with the present invention. The process starts as depicted by block 500 and thereafter passes to block 502 which illustrates an application or kernel routine executing a load or store to a particular virtual address. Next, block 504 depicts the hardware checking a page table to obtain a virtual to real address translation for this virtual address. Block 506, then, illustrates a determination of whether or not a translation exists within the page table for this virtual address. If a determination is made that a translation does exist, the process passes to block 508 which depicts continuing normal processing.

Referring again to block 506, if a determination is made that a translation does not exist, the process passes to block 510 which illustrates the hardware reporting a page fault to the operating system, and disabling interrupts. Next, block 512 depicts getting a low level page lock on the page. Block 514 illustrates checking a flag to determine if translations may be entered into the page table for this page. The flag will be set when translations may not be entered into the page table for this page. This flag is described with reference to FIG. 3, block 322. Block 516, then, depicts a determination of whether or not the flag is set. If a determination is made that the flag is not set, the process passes to block 528. Referring again to block 516, if a determination is made that the flag is set, the process passes to block 518 which illustrates unlocking the low level lock on the real page. Next, block 520 depicts a determination of whether or not the fault occurred at an elevated interrupt level. If a determination is made that the fault did occur at an elevated interrupt level, the process passes to block 522 which illustrates the routine spinning with interrupts already disabled. The process then passes to block 512. Referring again to block 520, if a determination is made that the fault did not occur at an elevated interrupt level, the process passes to block 524.

Block 524 illustrates enabling interrupts and acquiring a segment lock for this page. Thereafter, block 526 depicts acquiring a low level lock on this real page. Next, block 528 illustrates entering a hardware translation in the page table for this virtual to real address. The process then passes to block 530 which depicts unlocking the low level lock on this real page. Block 532, then, illustrates a determination of whether or not a segment lock was acquired, as depicted by block 524. If a determination is made that a segment was not acquired, as depicted by block 524, the process passes back to block 508. Referring again to block 532, if a determination is made that a segment lock was acquired, as depicted by block 524, the process passes to block 534 which depicts unlocking the segment lock, thus serializing with the migration process depicted in FIG. 3 by block 302. The process then passes back to block 508.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, said method comprising the steps of:

establishing a real page of data;

generating virtual addresses that are associated with real addresses that are included within said real page;

establishing a page table that includes translations of said virtual addresses to said real addresses;

executing a routine that accesses said page table to obtain said translations, said routine utilizing said virtual addresses to access said data stored in said real page;

while said routine is executing, migrating said data to a new real page; and updating said page table while said routine is executing, wherein said routine utilizes said virtual addresses to access said data stored in said new real page, further wherein said execution of said routine continues while said page table is being updated.

2. The method according to claim 1, wherein the step of updating said page table further comprises the steps of:

removing said translations of virtual addresses to said real addresses from said page table;

copying said data from said real page to said new page; and storing new translations in said page table, wherein said new translations map said virtual addresses to real addresses that are included within said new real page.

3. The method according to claim 1, further comprising the steps of:

prior to the step of migrating said data to a new real page while said routine is executing, obtaining a segment lock for said real page; and releasing said segment lock for said real page after said page table is updated.

4. The method according to claim 1, further comprising the steps of:

determining whether said real page is being used by another routine prior to said step of migrating said data to a new real page;

in response to a determination that said real page is being used by another routine, waiting until said real page is no longer being used by another routine before executing said step of migrating said data to a new real page; and in response to a determination that said real page is not being used by another routine, migrating said data to a new real page.

5. The method according to claim 4, further comprising the steps of:

associating a use counter with said real page;

wherein said step of determining whether said real page is being used to another routine prior to said step of migrating said data to a new real page further includes the step of determining a current value of said use counter;

in response to a determination that said use counter is zero, determining that said real page is not being used by another routine; and in response to a determination that said use counter is not zero, determining that said real page is being used by another routine.

6. The method according to claim 1, wherein the step of migrating said data to a new real page further comprises the step of:

copying said data from said real page to said new real page in real mode.

7. The method according to claim 1, further comprising the steps of:

determining whether said real page is being used by another routine prior to said step of migrating said data to a new real page; and in response to a determination that said real page is being used by another routine, said routine spinning.

8. The method according to claim 1, further comprising the steps of:

executing a kernel routine that attempts to access said real page utilizing said real addresses; and requiring said kernel routine to call a service prior to permitting said kernel routine to access said real addresses.

9. The method according to claim 8, further comprising the steps of:

determining whether a flag is set that indicates that said real page is currently being used;

in response to a determination that said flag is set, waiting until said flag is cleared before permitting said kernel routine to access said real addresses; and in response to a determination that said flag is not set, permitting said kernel routine to access said real addresses.

10. The method according to claim 1, further comprising the steps of:

executing a routine which attempts to access one of said virtual addresses;

determining whether a translation exists in a page table for said one of said virtual addresses;

in response to a determination that said translation does not exist, causing said routine to spin which causes a suspension of execution of said routine;

in response to said routine being released from spinning, determining whether said translation exists in a page table for said one of said virtual addresses;

in response to said translation not existing, generating, by said routine, said translation; and in response to said translation existing, utilizing said translation to access data.

11. The method according to claim 1, wherein said data processing system is a logically partitioned data processing system.

12. A method in a data processing system, said method comprising the steps of:

executing a first routine that accesses a particular virtual address, said virtual address being mapped to a particular real address, wherein said first routine is accessing said real address;

executing a second routine that initiates a migration of data that is stored in a particular real page, said particular real page including said particular real address;

migrating said data that is stored in said particular real page to a new real page while said first routine is executing; and said migration being transparent to said first routine.

13. The method according to claim 12, further comprising the steps of:

executing a third routine that selects said particular real page to be removed;

calling, by said third routine, said second routine; and in response to said migration being completed, said third routine removing said particular real page.

14. A data processing system comprising:

a real page of data;

virtual addresses that are associated with real addresses that are included within said real page;

a page table that includes translations of said virtual addresses to said real addresses;

executing means for executing a routine that accesses said page table to obtain said translations, said routine utilizing said virtual addresses to access said data stored in said real page;

while said routine is executing, migration means for migrating said data to a new real page; and said page table being updated while said routine is executing, wherein said routine utilizes said virtual addresses to access said data stored in said new real page, further wherein said execution of said routine continues while said page table is being updated.

15. The system according to claim 14, wherein said page table being updated further comprises:

said translations of virtual addresses to said real addresses being removed from said page table;

said data being copied from said real page to said new page; and new translations being stored in said page table, wherein said new translations map said virtual addresses to real addresses that are included within said new real page.

16. The system according to claim 14, further comprising:

prior to said migration means for migrating said data to a new real page while said routine is executing, obtaining means for obtaining a segment lock for said real page; and releasing means for releasing said segment lock for said real page after said page table is updated.

17. The system according to claim 14, further comprising:

determining means for determining whether said real page is being used by another routine prior to said migrating means migrating said data to a new real page;

in response to a determination that said real page is being used by another routine, said migrating means waiting until said real page is no longer being used by another routine before migrating said data to a new real page; and in response to a determination that said real page is not being used by another routine, migrating means for migrating said data to a new real page.

18. The system according to claim 17, further comprising:

a use counter being associated with said real page;

wherein said determining means for determining whether said real page is being used to another routine prior to said migrating means migrating said data to a new real page further includes determining means for determining a current value of said use counter;

in response to a determination that said use counter is zero, determining means for determining that said real page is not being used by another routine; and in response to a determination that said use counter is not zero, determining means for determining that said real page is being used by another routine.

19. The system according to claim 14, wherein said migrating means for migrating said data to a new real page further comprises:

copying means for copying said data from said real page to said new real page in real mode.

20. The system according to claim 14, further comprising:

determining means for determining whether said real page is being used by another routine prior to said migrating means migrating said data to a new real page; and in response to a determination that said real page is being used by another routine, said routine spinning.

21. The system according to claim 14, further comprising:

a kernel routine being executed that attempts to access said real page utilizing said real addresses; and requiring means for requiring said kernel routine to call a service prior to permitting said kernel routine to access said real addresses.

22. The system according to claim 21, further comprising:

determining means for determining whether a flag is set that indicates that said real page is currently being used;

in response to a determination that said flag is set, said kernel routine waiting until said flag is cleared before being permitted to access said real addresses; and in response to a determination that said flag is not set, said kernel routine being permitted to access said real addresses.

23. The system according to claim 14, further comprising:
a routine being executed which attempts to access one of said virtual addresses;
determining means for determining whether a translation exists in a page table for said one of said virtual addresses;
in response to a determination that said translation does not exist, said routine spinning which causes a suspension of execution of said routine;
in response to said routine being released from spinning, determining means for determining whether said translation exists in a page table for said one of said virtual addresses;
in response to said translation not existing, said routine generating said translation; and
in response to said translation existing, said translation being utilized to access data.

24. The system according to claim 14, wherein said data processing system is a logically partitioned data processing system.

25. A data processing system comprising:
a first routine that accesses a particular virtual address, said virtual address being mapped to a particular real address, wherein said first routine is accessing said real address;
a second routine that initiates a migration of data that is stored in a particular real page, said particular real page including said particular real address;
said data that is stored in said particular real page being migrated to a new real page while said first routine is executing; and
said migration being transparent to said first routine.

26. The system according to claim 25, further comprising:
a third routine that selects said particular real page to be removed;
said third routine calling said second routine; and
in response to said migration being completed, said third routine removing said particular real page.

27. A computer program product in a data processing system, said product comprising:
instruction means for establishing a real page of data;
instruction means for generating virtual addresses that are associated with real addresses that are included within said real page;
instruction means for establishing a page table that includes translations of said virtual addresses to said real addresses;
instruction means for executing a routine that accesses said page table to obtain said translations, said routine utilizing said virtual addresses to access said data stored in said real page;
while said routine is executing, instruction means for migrating said data to a new real page; and
instruction means for updating said page table while said routine is executing, wherein said routine utilizes said virtual addresses to access said data stored in said new real page, further wherein said execution of said routine continues while said page table is being updated.

28. The product according to claim 27, wherein said instruction means for updating said page table further comprises:
instruction means for removing said translations of virtual addresses to said real addresses from said page table;
instruction means for copying said data from said real page to said new page; and
instruction means for storing new translations in said page table, wherein said new translations map said virtual addresses to real addresses that are included within said new real page.

29. The product according to claim 27, further comprising:
prior to said instruction means for migrating said data to a new real page while said routine is executing, instruction means for obtaining a segment lock for said real page; and
instruction means for releasing said segment lock for said real page after said page table is updated.

30. The product according to claim 27, further comprising:
instruction means for determining whether said real page is being used by another routine prior to said step of migrating said data to a new real page;
in response to a determination that said real page is being used by another routine, instruction means for waiting until said real page is no longer being used by another routine before executing said step of migrating said data to a new real page; and
in response to a determination that said real page is not being used by another routine, instruction means for migrating said data to a new real page.

31. The product according to claim 30, further comprising:
instruction means for associating a use counter with said real page;
wherein said step of determining whether said real page is being used to another routine prior to said instruction means for migrating said data to a new real page further includes instruction means for determining a current value of said use counter;
in response to a determination that said use counter is zero, instruction means for determining that said real page is not being used by another routine; and
in response to a determination that said use counter is not zero, instruction means for determining that said real page is being used by another routine.

32. The product according to claim 27, wherein said instruction means for migrating said data to a new real page further comprises:
instruction means for copying said data from said real page to said new real page in real mode.

33. The product according to claim 27, further comprising:
instruction means for determining whether said real page is being used by another routine prior to said step of migrating said data to a new real page; and
in response to a determination that said real page is being used by another routine, instruction means for said routine spinning.

34. The product according to claim 27, further comprising:
instruction means for executing a kernel routine that attempts to access said real page utilizing said real addresses; and
instruction means for requiring said kernel routine to call a service prior to permitting said kernel routine to access said real addresses.

35. The product according to claim 34, further comprising:

instruction means for determining whether a flag is set that indicates that said real page is currently being used;

in response to a determination that said flag is set, instruction means for waiting until said flag is cleared before permitting said kernel routine to access said real addresses; and in response to a determination that said flag is not set, instruction means for permitting said kernel routine to access said real addresses.

36. The product according to claim 27, further comprising:

instruction means for executing a routine which attempts to access one of said virtual addresses;

instruction means for determining whether a translation exists in a page table for said one of said virtual addresses;

in response to a determination that said translation does not exist, instruction means for causing said routine to spin which causes a suspension of execution of said routine;

in response to said routine being released from spinning, instruction means for determining whether said translation exists in a page table for said one of said virtual addresses;

in response to said translation not existing, instruction means for generating, by said routine, said translation; and in response to said translation existing, instruction means for utilizing said translation to access data.

37. The product according to claim 27, wherein said data processing system is a logically partitioned data processing system.

38. A computer program product in a data processing system, said product comprising:

instruction means for executing a first routine that accesses a particular virtual address, said virtual address being mapped to a particular real address, wherein said first routine is accessing said real address;

instruction means for executing a second routine that initiates a migration of data that is stored in a particular real page, said particular real page including said particular real address;

instruction means for migrating said data that is stored in said particular real page to a new real page while said first routine is executing; and said migration being transparent to said first routine.

39. The product according to claim 38, further comprising:

instruction means for executing a third routine that selects said particular real page to be removed;

instruction means for calling, by said third routine, said second routine; and in response to said migration being completed, instruction means for said third routine removing said particular real page.

* * * * *